(12) United States Patent
Kim et al.

(10) Patent No.: US 11,646,816 B2
(45) Date of Patent: May 9, 2023

(54) METHOD AND APPARATUS FOR TRANSMITTING AND RECEIVING DATA CHANNELS IN WIRELESS COMMUNICATION SYSTEM

(71) Applicant: Samsung Electronics Co., Ltd., Suwon-si (KR)

(72) Inventors: Taehyoung Kim, Suwon-si (KR); Youngbum Kim, Suwon-si (KR); Jinyoung Oh, Suwon-si (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/975,086

(22) PCT Filed: Feb. 20, 2019

(86) PCT No.: PCT/KR2019/002028
§ 371 (c)(1),
(2) Date: Aug. 21, 2020

(87) PCT Pub. No.: WO2019/164236
PCT Pub. Date: Aug. 29, 2019

(65) Prior Publication Data
US 2021/0091880 A1    Mar. 25, 2021

(30) Foreign Application Priority Data

Feb. 23, 2018   (KR) .......................... 10-2018-0022216

(51) Int. Cl.
*H04L 5/00* (2006.01)
*H04L 1/00* (2006.01)
(Continued)

(52) U.S. Cl.
CPC .......... *H04L 1/0013* (2013.01); *H04L 1/1812* (2013.01); *H04W 72/1289* (2013.01)

(58) Field of Classification Search
None
See application file for complete search history.

(56) References Cited

U.S. PATENT DOCUMENTS 11,382,124 B2 * 7/2022 Moon ................... H04L 5/0044
2016/0302092 A1 10/2016 Sartori et al.
(Continued)

OTHER PUBLICATIONS

Nokia et al., "On remaining details on BWPs", 3GPP TSG-RAN WG1 Meeting #92, Feb. 26-Mar. 2, 2018, R1-1802539, 9 pages.
(Continued)

*Primary Examiner* — Brandon M Renner

(57) ABSTRACT

The present disclosure relates to a communication technique for fusing, with an IoT technology, a 5G communication system for supporting a higher data transmission rate than a 4G system, and a system therefor. The present disclosure may be applied to intelligent services, such as smart homes, smart buildings, smart cities, smart cars or connected cars, health care, digital education, retail, and security and safety related services, on the basis of 5G communication technologies and IoT-related technologies. A method of a terminal according to an embodiment of the present invention comprises: receiving an indicator for changing a bandwidth from a base station; identifying whether there is a signal to be transmitted on the changed bandwidth at a time of transmitting hybrid automatic repeat request (HARQ) ACK information for data received on a secondary cell (SCell) from the base station; and multiplexing and transmitting the signal and the HARQ ACK information in case that there is a signal to be transmitted in the changed bandwidth.

20 Claims, 10 Drawing Sheets

(51) Int. Cl.
    *H04L 1/1812*     (2023.01)
    *H04W 72/12*     (2023.01)

(56) References Cited

U.S. PATENT DOCUMENTS

| | | | |
|---|---|---|---|
| 2017/0105198 A1 | 4/2017 | Fu et al. | |
| 2019/0149365 A1* | 5/2019 | Chatterjee | H04L 5/0044 370/329 |
| 2019/0229840 A1* | 7/2019 | Takeda | H04L 5/0044 |
| 2019/0280803 A1* | 9/2019 | Muruganathan | H04L 5/0044 |

OTHER PUBLICATIONS

Nokia et al. "On remaining details of BWPs", 3GPP TSG-RAN WG1 Meeting NR1801, Jan. 22-26, 2018, R1-1800552, 7 pages.
MediaTek Inc., "Remaining Details on Bandwidth Part Operation in NR", 3GPP TSG RAN WG1 Meeting #92, Feb. 26-Mar. 2, 2018, R1-1801638, 11 pages.
Huawei, HiSilicon, "Summary of Remaining issues on NR CA", 3GPP TSG RAN WG1 Meeting #92, Feb. 26-Mar. 2, 2018, R1-1801348, 7 pages.
International Search Report dated Jun. 4, 2019 in connection with International Patent Application No. PCT/KR2019/002028, 2 pages.
Written Opinion of the International Searching Authority dated Jun. 4, 2019 in connection with International Patent Application No. PCT/KR2019/002028, 5 pages.
Office Action dated Mar. 10, 2022, in connection with Korean Application No. 10-2018-0022216, 8 pages.
CATT, "Remaining issues on CSI-RS," R1-1801723, 3GPP TSG RAN WG1 Meeting #92, Athens, Greece, Feb. 26-Mar. 2, 2018, 9 pages.
Ericsson, "Review issue list for TS 38.331 EN-DC ASN.1 freeze," Tdoc R2-1803550, 3GPP TSG-RAN2#AH-1801, Vancouver, Canada, Jan. 22-26, 2018, 377 pages.
Samsung, "On Rate Matching," R1-1720351, 3GPP TSG RAN WG1 Meeting 91, Reno, USA, Nov. 27-Dec. 1, 2017, 8 pages.

* cited by examiner

METHOD AND APPARATUS FOR TRANSMITTING AND RECEIVING DATA CHANNELS IN WIRELESS COMMUNICATION SYSTEM

CROSS-REFERENCE TO RELATED APPLICATIONS

This application is a 371 of International Application No. PCT/KR2019/002028 filed on Feb. 20, 2019, which claims priority to Korean Patent Application No. 10-2018-0022216 filed on Feb. 23, 2018, the disclosures of which are herein incorporated by reference in their entirety.

FIELD

The disclosure relates to a method and an apparatus for transmitting or receiving data through a data channel in a wireless communication system.

DESCRIPTION OF RELATED ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

In 5G, the base station may configure, in a terminal, specific time and frequency resources as rate-matching resources (RMRs) for various objectives, and may perform rate matching for the configured rate-matching resource part to transmit or receive a data channel. The base station may configure, in the terminal, time and frequency resource domains for the rate-matching resource and a period in which a corresponding rate-matching resource occurs via higher layer signaling. Accordingly, one or a plurality of rate-matching resources may be grouped and configured as a resource set group, and the base station may dynamically indicate whether rate matching for a data channel is performed in a rate-matching resource part, which is configured as the rate-matching group, through downlink control information (DCI).

Here, in the situation in which rate-matching resources having different period information are grouped and indicated by one DCI bit, a method of determining whether or not rate matching is performed in each rate-matching resource is required. The disclosure may include a method of considering all individual periods of rate-matching resources in a rate-matching group, a method of considering a period having the minimum value (or the greatest common factor) among the periods in the rate-matching group, a method of considering a period for each slot, and the like.

Meanwhile, in 5G, the base station may configure one or multiple bandwidth parts (BWP) for the terminal, and may dynamically change a specific bandwidth part through DCI.

Here, between the time point at which the terminal receives data through a PDSCH and the time point at which the terminal transmits a hybrid automatic repeat request (HARQ)-acknowledgement (ACK) for the data, a change in the UL bandwidth in which the HARQ-ACK needs to be transmitted may occur.

The disclosure proposes a method for transmitting a HARQ-ACK for data, which is received through a PDSCH in consideration of carrier aggregation. According to the disclosure, in the situation in which an HARQ-ACK for a scheduled PDSCH in an Scell is transmitted in a UL BWP of a Pcell, if the time point at which an HARQ-ACK for a PDSCH scheduled in the Pcell is transmitted or a PUSCH scheduled in the Pcell is transmitted is the same as the time point at which the HARQ-ACK for the Scell is transmitted, the Scell PDSCH HARQ-ACK may be transmitted through the changed UL BWP of the Pcell.

SUMMARY

In order to solve the problem described above, a method by a terminal according to the disclosure includes: receiving an indicator for switching a bandwidth part from a base station; identifying whether a signal to be transmitted on a switched bandwidth part exists at a time point at which hybrid automatic repeat request (HARQ) ACK information for data, which has been received from the base station on a secondary cell (SCell), is transmitted; and in case that a signal to be transmitted on the switched bandwidth part exists, multiplexing and transmitting the signal and the HARQ ACK information.

In order to solve the problem described above, a method by a base station according to the disclosure includes: transmitting an indicator for changing a bandwidth part to a terminal; and in case that a signal to be received through the changed bandwidth part exists at a time point at which hybrid automatic repeat request (HARQ) ACK information for data, which has been transmitted to the terminal through a secondary cell (SCell), is received, receiving the HARQ ACK information multiplexed with the signal.

In order to solve the problem described above, a terminal according to the disclosure includes: a transceiver, and a controller configured to: receive an indicator for changing a bandwidth part from a base station; identify whether a signal to be transmitted through the changed bandwidth part exists at a time point at which hybrid automatic repeat request (HARQ) ACK information for data, which has been received through a secondary cell (SCell) from the base station, is transmitted; and in case that a signal to be transmitted through the changed bandwidth part exists, multiplex and transmit the signal and the HARQ ACK information.

In order to solve the problem described above, a base station according to the disclosure includes: a transceiver, and a controller configured to: transmit an indicator for changing a bandwidth part to a terminal; and in case that a signal to be received through the changed bandwidth part exists at a time point at which hybrid automatic repeat request (HARQ) ACK information for data, which has been transmitted to the terminal through a secondary cell (SCell), is received, receive the HARQ ACK information multiplexed with the signal.

According to a method for transmitting and receiving signals through a downlink control channel and a data channel, proposed in the disclosure, it is possible to reduce the channel estimation complexity of a terminal, enable easy buffer management, and utilize radio resources more efficiently.

DETAILED DESCRIPTION

Figure 1:
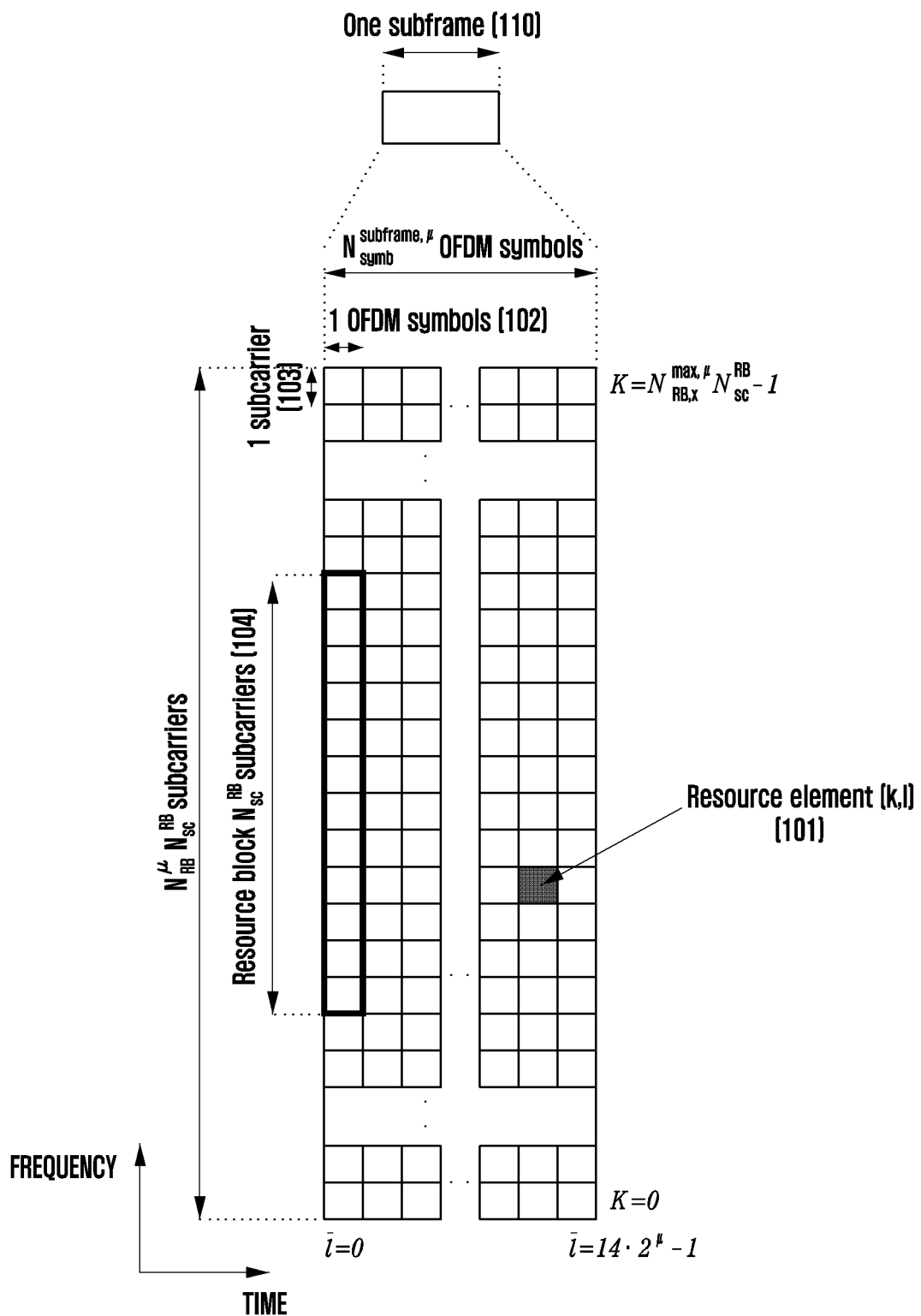
FIG. 1 illustrates the basic structure of a time-frequency domain in 5G.

Hereinafter, the operation principle of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure uses terms and names defined in the 3rd generation partnership project long term evolution (3GPP LTE) standard, which is the latest standard among the existing communication standards, for the convenience of description. However, the disclosure is not limited by these terms and names, and may be applied in the same way to systems that conform other standards. In particular, the disclosure may be applied to 3GPP new radio (NR: 5th mobile communication standard).

Wireless communication systems, which provided voice-oriented services in early stages, have evolved into broadband wireless communication systems that provide high-speed and high-quality packet data services according to communication standards such as high-speed packet access (HSPA) of 3GPP, long term evolution (LTE or evolved universal terrestrial radio access (E-UTRA)), LTE-advanced (LTE-A), LTE-Pro, high-rate packet data (HRPD) of 3GPP2, ultra-mobile broadband (UMB), and IEEE 802.16e.

In an LTE system, which is a representative example of a broadband wireless communication system, the downlink (DL) adopts an orthogonal frequency-division multiplexing (OFDM) scheme, and the uplink (UL) adopts a single-carrier frequency-division multiple access (SC-FDMA) scheme. The uplink is a radio link through which a terminal (a user equipment (UE)) or a mobile station (MS)) transmits data or a control signal to a base station (eNode B or BS), and the downlink is a radio link through which a base station transmits data or a control signal to a UE. In the multiple-access scheme described above, data or control information of each user is distinguished by performing allocation and operations such that time-frequency resources for carrying the data or control information for each UE do not overlap each other, that is, such that orthogonality is established.

As a future communication system after LTE, that is, a 5G communication system needs to freely reflect the various requirements of a user, a service provider, and the like, and thus services simultaneously satisfying the various requirements need to be supported. Services being considered for the 5G communication system include enhanced mobile broadband (eMBB) communication, massive machine-type communication (mMTC), ultra-reliability low-latency communication (URLLC), and the like.

The eMBB aims to provide a further enhanced data rate compared to the data rate supported by the existing LTE, LTE-A or LTE-Pro. For example, in the 5G communication system, the eMBB needs to support, from the viewpoint of one base station, a peak data rate of 20 Gbps in the downlink and a peak data rate of 10 Gbps in the uplink. In addition, the 5G communication system needs to provide an increased user-perceived data rate of a UE while providing the peak data rate. In order to satisfy these requirements, the 5G communication system requires various enhanced transmission or reception technologies including further enhanced multi-input multi-output (MIMO) transmission technology. Further, the LTE system transmits a signal using a 20 MHz maximum transmission bandwidth in the 2 GHz band. In contrast, the 5G communication system transmits a signal using a frequency bandwidth wider than 20 MHz in a frequency band of 3 to 6 GHz or in a frequency band higher than 6 GHz, and thus can satisfy the data rates necessary for the 5G communication system.

Further, in the 5G communication system, mMTC is being considered for implementation in order to support application services, such as those related to the Internet of Things (IoT). In order for mMTC to efficiently support the IoT, support for access by a large number of UEs within a cell, coverage improvement of a UE, increased battery lifetime, and a reduction in the cost of a UE are required. The IoT connects various sensors and various devices to provide a communication function, and thus needs to support a large number of UEs (e.g., 1,000,000 UEs/km$^2$) within a cell. Furthermore, a UE supporting mMTC requires wider coverage compared to other services provided by the 5G communication system because there is a good possibility that the UE may be located in a shadow area not covered by a cell, such as the underground of a building. A UE supporting mMTC needs to be configured as a cheap UE, and requires a very long battery life time, such as 10 to 15 years, because it is difficult to frequently replace the battery of the UE.

Finally, URLLC is a mission-critical cellular-based wireless communication service. The wireless communication service may be considered for implementation in remote control of robots or machinery, industrial automation, services used for unmanned aerial vehicles, remote health care, emergency alerts, and the like. Accordingly, communication provided by URLLC needs to satisfy requirements of very low latency and very high reliability.

For example, a service supporting the URLLC needs to satisfy a wireless access latency time (air interface latency) that is less than 0.5 ms, and also requires a packet error rate of $10^{-5}$ or less. Accordingly, for service supporting URLLC, the 5G system needs to provide a transmission time interval (TTI) that is smaller than that of other services, and also requires design for allocating resources in a wide frequency band in order to secure reliability of a communication link.

Three services of the 5G system, namely, eMBB, URLLC, and mMTC, may be multiplexed and transmitted in one system. In order to satisfy the different requirements of the services, different transmission and reception schemes and parameters may be used between the services.

Hereinafter, the frame structure of the 5G system will be described in more detail with reference to the drawings.

FIG. 1 illustrates the basic structure of a time-frequency domain, which is a radio resource domain in which data or a control channel is transmitted in a 5G system.

Referring to FIG. 1, a horizontal axis indicates a time domain, and a vertical axis indicates a frequency domain. The basic unit of the time-frequency domain is a resource element (RE) 101, and the RE may be defined by 1 orthogonal frequency-division multiplexing (OFDM) symbol 102 on the time domain and 1 subcarrier 103 on the frequency domain. In the frequency domain, $N_{sc}^{RB}$ (e.g., 12) consecutive REs may configure one resource block (RB) 104.

Hereinafter, a slot structure considered for implementation in the 5G system will be described. The resource structure considered for implementation in the 5G system may include a frame, a subframe 201, and a slot 202.

1 frame may be defined by 10 ms. 1 subframe may be defined by 1 ms, and thus 1 frame may be configured by a total of 10 subframes. 1 slot may be defined by 14 OFDM symbols (i.e., the number of symbols per slot ($N_{symb}^{slot}$)= 14). 1 subframe may be configured by one or multiple slots, and the number of slots per subframe may differ depending on the configuration value μ 204 and 205 for the subcarrier interval. For example, the case where μ=0 and the case where μ=1 are assumed to be subcarrier interval configuration values. In the case where μ=0, 1 subframe may be configured by 1 slot, and in the case where μ=1, 1 subframe may be configured by two slots. That is, the number of slots ($N_{slot}^{subframe,\mu}$) per subframe may differ according to the configuration value for the subcarrier interval, and thus the number of slots ($N_{slot}^{frame,\mu}$) per frame may differ. $N_{slot}^{subframe,\mu}$ and $N_{slot}^{frame,\mu}$ according to each subcarrier spacing configuration may be defined as in <Table 1> below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Next, DCI in the 5G system will be described in detail.

In the 5G system, scheduling information for uplink data (or a physical uplink shared channel (PUSCH)) or downlink data (or a physical downlink shared channel (PDSCH)) is transmitted from a base station to a UE through DCI. In the disclosure, an operation of transmitting or receiving data through an uplink or downlink data channel may be expressed as transmitting an uplink or downlink data channel. Further, an operation of transmitting or receiving control information through an uplink or downlink control channel may be expressed as transmitting an uplink or downlink data channel.

The UE may monitor a DCI format for fallback and a DCI format for non-fallback for PUSCH or PDSCH. The DCI format for fallback may be configured by fixed fields defined in advance between the base station and the UE, and the DCI format for non-fallback may include a configurable field.

The fallback DCI for scheduling the PUSCH may include, for example, the following pieces of information.

TABLE 2

Identifier for DCI formats (DCI format identifier)- [1] bit
Frequency domain resource assignment
[ $\lceil \log_2 (N_{RB}^{UL,BWP} (N_{RB}^{UL,BWP} + 1) / 2) \rceil$ ] bits

TABLE 2-continued

Time domain resource assignment - X bits
Frequency hopping flag - 1 bit.
Modulation and coding scheme - 5 bits
New data indicator - 1 bit
Redundancy version - 2 bits
Hybrid automatic repeat request (HARQ) process number - 4 bits
TPC command for scheduled PUSCH (wherein TPC indicates transmit power control) - 2 bits
UL/supplementary uplink (SUL) indicator - 0 or 1 bit The non-fallback DCI for scheduling the PUSCH may include, for example, the following pieces of information.

TABLE 3

Carrier indicator - 0 or 3 bits
Identifier for DCI formats - [1] bits
Bandwidth part indicator - 0, 1 or 2 bits
Frequency domain resource assignment
    For resource allocation type 0, $\lceil N_{RB}^{UL,BWP}/P \rceil$ bits
    For resource allocation type 1, $\lceil \log_2(N_{RB}^{UL,BWP}(N_{RB}^{UL,BWP}+1)/2) \rceil$ bits
Time domain resource assignment -1, 2, 3, or 4 bits
VRB-to-PRB mapping - 0 or 1 bit, only for resource allocation type 1.
    0 bit if only resource allocation type 0 is configured;
    1 bit otherwise.
Frequency hopping flag - 0 or 1 bit, only for resource allocation type 1.
    0 bit if only resource allocation type 0 is configured;
    1 bit otherwise.
Modulation and coding scheme - 5 bits
New data indicator - 1 bit
Redundancy version - 2 bits
HARQ process number - 4 bits
1st downlink assignment index - 1 or 2 bits
    1 bit for semi-static HARQ-ACK codebook;
    2 bits for dynamic HARQ-ACK codebook with single HARQ-ACK codebook.
2nd downlink assignment index - 0 or 2 bits
    2 bits for dynamic HARQ-ACK codebook with two HARQ-ACK sub-codebooks;
    0 bit otherwise.

TABLE 3-continued

TPC command for scheduled PUSCH - 2 bits

SRS resource indicator - $\left\lceil \log_2\left(\sum_{k=1}^{L_{max}} \binom{N_{SRS}}{k}\right)\right\rceil$ or $\lceil \log_2(N_{SRS}) \rceil$ bits $\left\lceil \log_2\left(\sum_{k=1}^{L_{max}} \binom{N_{SRS}}{k}\right)\right\rceil$ bits for non–codebook based PUSCH transmission;

$\lceil \log_2(N_{SRS}) \rceil$ bits for codebook based PUSCH transmission.
Precoding information and number of layers-up to 6 bits
Antenna ports- up to 5 bits
SRS request- 2 bits
CSI request - 0, 1, 2, 3, 4, 5, or 6 bits
CBG transmission information- 0, 2, 4, 6, or 8 bits
PTRS-DMRS association - 0 or 2 bits.
beta_offset indicator- 0 or 2 bits
DMRS sequence initialization- 0 or 1 bit
UL/SUL indicator - 0 or 1 bit The fallback DCI for scheduling the PDSCH may include, for example, the following pieces of information.

TABLE 4

Identifier for DCI formats - [1] bit
Frequency domain resource assignment -[ $\lceil \log_2 (N_{RB}^{DL,BWP} (N_{RB}^{DL,BWP} +1)/2) \rceil$ ] bits
Time domain resource assignment - X bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
PUCCH resource indicator - 3 bits
PDSCH-to-HARQ feedback timing indicator - [3] bits The non-fallback DCI for scheduling the PDSCH may include, for example, the following information.

TABLE 5

Carrier indicator - 0 or 3 bits
Identifier for DCI formats - [1] bits
Bandwidth part indicator - 0, 1 or 2 bits
Frequency domain resource assignment
    For resource allocation type 0, $\lceil N_{RB}^{DL,BWP} / P \rceil$ bits
    For resource allocation type 1, $\lceil \log_2 (N_{RB}^{DL,BWP} (N_{RB}^{DL,BWP} +1) / 2) \rceil$ bits
Time domain resource assignment - 1, 2, 3, or 4 bits
VRB-to-PRB mapping - 0 or 1 bit, only for resource allocation type 1.
    0 bit if only resource allocation type 0 is configured;
    1 bit otherwise.

TABLE 5-continued

PRB bundling size indicator - 0 or 1 bit
Rate matching indicator- 0, 1, or 2 bits
ZP CSI-RS trigger - 0, 1, or 2 bits
For transport block 1:
  Modulation and coding scheme - 5 bits
  New data indicator - 1 bit
  Redundancy version - 2 bits
For transport block 2:
  Modulation and coding scheme - 5 bits
  New data indicator - 1 bit
  Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator - 3 bits
Antenna ports - 4, 5 or 6 bits
Transmission configuration indication- 0 or 3 bits
SRS request - 2 bits
CBG transmission information - 0, 2, 4, 6, or 8 bits
CBG flushing out information- 0 or 1 bit
DMRS sequence initialization - 1 bit The DCI may be transmitted through a physical downlink control channel (PDCCH) after performing a channel-coding and modulation process. A cyclic redundancy check (CRC) is attached to a DCI message payload, and the CRC is scrambled using a radio network temporary identifier (RNTI) corresponding to the identification of the UE.

Different RNTIs are used depending on the objective of a DCI message, for example, UE-specific data transmission, a power control command, or a random access response. That is, the RNTI is not explicitly transmitted, but is included in a CRC calculation process and transmitted. When a DCI message transmitted on a PDCCH is received, a UE identifies a CRC using an allocated RNTI, and if CRC results are correct, the UE may be made aware that the corresponding message has been transmitted to the UE.

For example, DCI scheduling a PDSCH for system information (SI) may be scrambled using an SI-RNTI. The DCI scheduling a PDSCH for a random access response (RAR) message may be scrambled using an RA-RNTI. The DCI scheduling a PDSCH for a paging message may be scrambled using a P-RNTI. DCI providing notification of a slot format indicator (SFI) may be scrambled using an SFI-RNTI. DCI providing notification of a transmit power control (TPC) may be scrambled using a TPC-RNTI. DCI for scheduling the UE-specific PDSCH or PUSCH may be scrambled using a cell RNTI (C-RNTI).

Hereinafter, a method for configuring a rate-matching resource with the goal of performing rate matching in a 5G communication system will be described. Rate matching refers to an operation of adjusting the magnitude of a signal by considering the amount of resources required to transmit the signal. For example, rate matching of a data channel refers to an operation in which the amount of data is adjusted without mapping or transmitting a data channel with respect to specific time and frequency resource domains.

Figure 2:
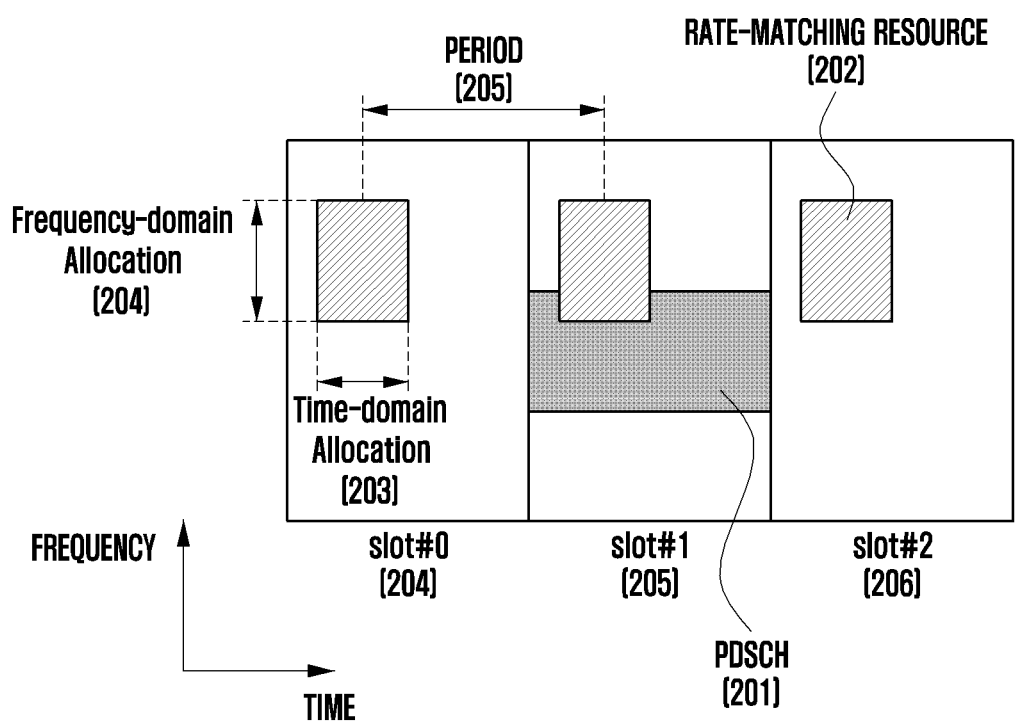
FIG. 2 illustrates an example of rate matching for a data channel in 5G.

FIG. 2 illustrates an example of rate matching for a data channel in 5G.

FIG. 2 illustrates a downlink data channel 201 and a rate-matching resource 202. A base station may configure one or multiple rate-matching resources 202 in a UE via higher layer signaling (e.g., RRC signaling).

Configuration information of the rate-matching resource 202 may include time-domain resource allocation information 203, frequency-domain resource allocation information 204, and period information 205. Hereinafter, a bitmap corresponding to the frequency-domain resource allocation information 204 is referred to as a "first bitmap", a bitmap corresponding to the time-domain resource allocation information 203 is referred to as a "second bitmap", and a bitmap corresponding to the period information 205 is referred to as a "third bitmap".

If all or some of the time and frequency resources of the scheduled data channel 201 overlap the configured rate-matching resource 202, the base station may perform rate matching for the data channel 201 in the rate-matching resource 202 part and transmit the same. A UE may perform reception and decoding under the assumption that rate matching for the data channel 201 has been performed in the rate-matching resource 202 part.

The base station may dynamically notify the UE whether to perform rate matching for the data channel in the configured rate-matching resource part, through additional configuration, through the DCI. Specifically, the base station may select some of the configured rate-matching resources and group the selected rate-matching resources into a rate-matching resource group, and may indicate to the UE whether a data channel has been rate-matched with respect to each rate-matching resource group, through the DCI, using a bitmap method.

For example, if four rate-matching resources RMR #1, RMR #2, RMR #3, and RMR #4 have been configured, the base station may configure RMG #1={RMR #1, RMR #2} and RMG #2={RMR #3, RMR #4} as rate-matching groups, and may indicate to the UE whether rate matching in each of RMG #1 and RMG #2 has been performed using 2 bits in the DCI field in the form of a bitmap. For example, if rate matching needs to be performed, a bit in the DCI field is configured as "1", and if rate matching does not need to be performed, the bit in the DCI field is configured as "0" so as to indicate whether or not rate matching has been performed.

An indicator indicating whether a data channel has been rate-matched with respect to a rate-matching resource group is referred to as a "rate-matching indicator".

Hereinafter, a method for scheduling a data channel in a 5G communication system will be described.

Figure 3:
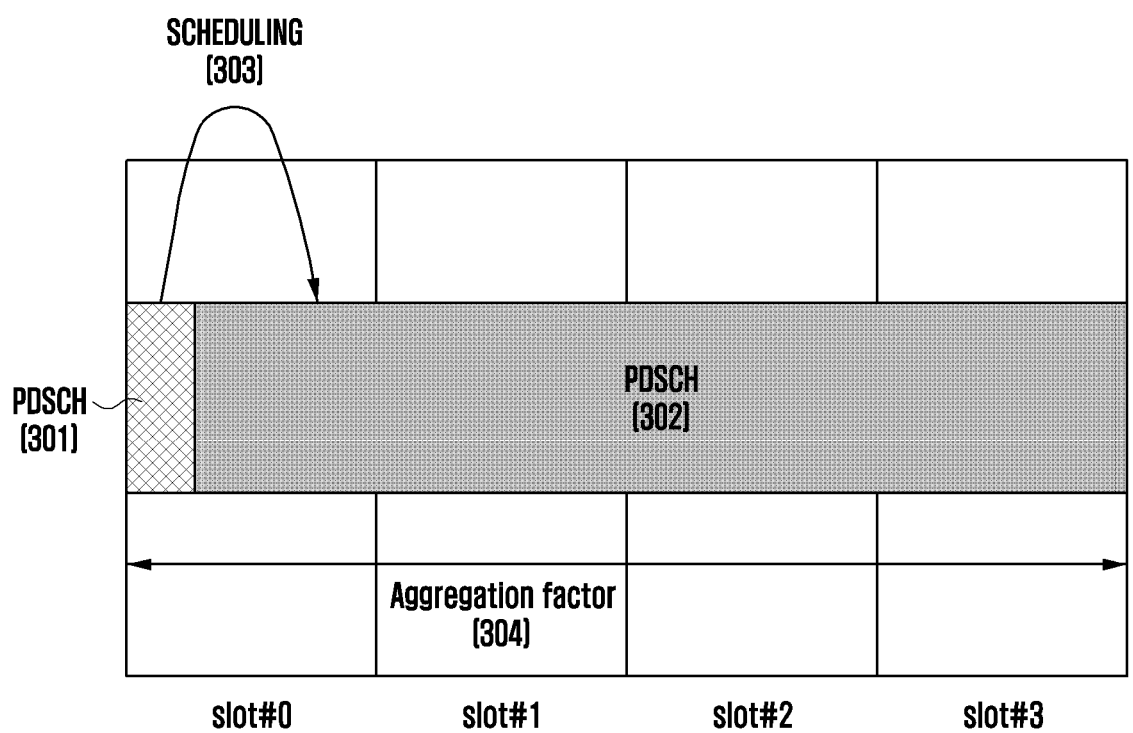
FIG. 3 illustrates an example of multi-slot scheduling for a data channel in 5G.

FIG. 3 illustrates an example of multi-slot scheduling supported by 5G.

A base station may quasi-statically configure, in a UE, an aggregation factor 304 for data channel scheduling via higher layer signaling (e.g., RRC signaling). The aggregation factor 304 may have values of 1, 2, 4, 8, for example. The base station may notify the UE of scheduling information for a data channel through the DCI, and the UE may obtain final scheduling information for the data channel by combining the scheduling information received through the DCI and information of the configured aggregation factor 304.

FIG. 3 shows an example in which the aggregation factor 304 is configured as 4 with respect to a downlink data channel 302. The base station may indicate, to a UE, information on scheduling 303 for the downlink data channel 302 through the downlink control channel 301. The UE may receive data through the data channel 302 under the assumption that the scheduling information for the data channel 302, received through the DCI, is repeated as many times as the configured aggregation factor 304. For example, when the aggregation factor 304 is 4, the base station may transmit data through the downlink data channel 302 in four slots.

Hereinafter, a method for configuring a bandwidth part considered for implementation in a 5G communication system will be described.

Figure 4:
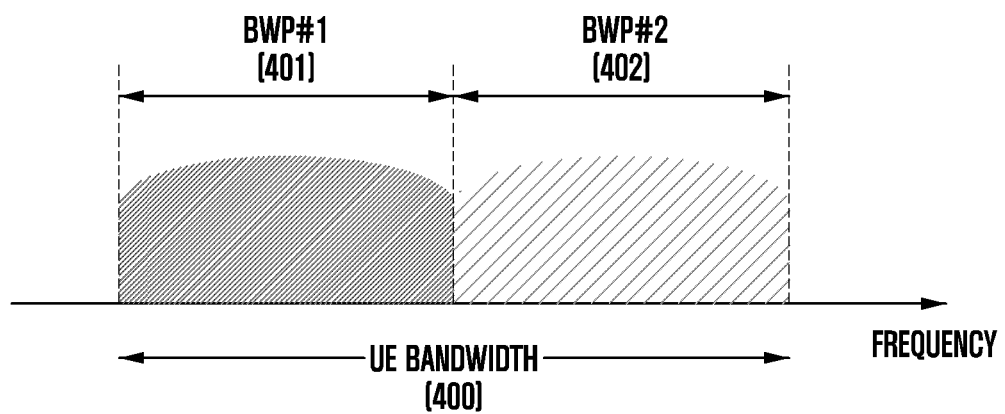
FIG. 4 illustrates an example of the configuration of a bandwidth part in 5G.

FIG. 4 illustrates an example of configuration of a bandwidth part in a 5G communication system.

Referring to FIG. 4, an example in which a UE bandwidth 400 part is configured by two bandwidth parts, that is, bandwidth part #1 401 and bandwidth part #2 402, is shown. The base station may configure one or a plurality of bandwidth parts in a UE, and may configure the following pieces of information for each bandwidth part.

TABLE 6

Configuration information 1. A bandwidth of a bandwidth part (the number of PRBs configuring a bandwidth part)
Configuration information 2. Frequency location of a bandwidth part (an offset value in comparison with a reference point, and the reference point may be, for example, the center frequency of the carrier, a synchronization signal, a synchronization signal raster, etc.)
Configuration information 3. Numerology of a bandwidth part (for example, subcarrier spacing, a length of a cyclic prefix (CP), etc.)
Otherwise In addition to the configuration information described above, various parameters related to the bandwidth part may be configured in the UE. The information described above may be transmitted by the base station to the UE via higher layer signaling, for example, RRC signaling.

At least one bandwidth part among the configured one or multiple bandwidth parts may be activated. Whether the configured bandwidth part has been activated may be semi-statically transmitted via RRC signaling from the base station to the UE, or may be dynamically transmitted through a MAC CE or DCI.

The configuration of a bandwidth part supported by 5G may be used for various objectives.

For example, in the case in which the bandwidth supported by the UE is smaller than the system bandwidth, signal transmission or reception may be performed in the bandwidth supported by the UE through the configuration of the bandwidth part. For example, in <Table 6>, the frequency location (configuration information 2) of the bandwidth part is configured in the UE, and thus the UE may transmit or receive data at a specific frequency location within the system bandwidth.

According to another example, with the goal of supporting different numerologies, the base station may configure multiple bandwidth parts in the UE. For example, in order to provide support for data transmission or reception using a subcarrier spacing of 15 kHz and a subcarrier spacing of 30 kHz to an arbitrary UE, two bandwidth parts may be configured to use subcarrier spacings of 15 kHz and 30 kHz, respectively. Different bandwidth parts may be subject to frequency-division multiplexing (FDM), and in the case of trying to transmit or receive data at a specific subcarrier interval, a bandwidth part configured at corresponding subcarrier intervals may be activated.

According to another example, with the goal of reducing the amount of power consumed by the UE, the base station may configure a bandwidth part having different bandwidths in the UE. For example, in the case in which the UE supports a very large bandwidth, for example, a bandwidth of 100 MHz, and always transmits or receives data through the corresponding bandwidth, high large power consumption may result. In particular, in the situation in which there is no traffic, unnecessary monitoring of a downlink control channel for a large bandwidth of 100 MHz by the UE may be very inefficient in terms of power consumption. Therefore, with the goal of reducing the power consumption by the UE, the base station may configure, in the UE, a bandwidth part corresponding to a relatively small bandwidth, for example, a bandwidth part of 20 MHz. In the situation where there is no traffic, the UE may perform a monitoring operation in a 20 MHz bandwidth part, and in the case where there is data, the UE may transmit or receive data using 100 MHz bandwidth part according to the instructions of the base station.

Hereinafter, embodiments of the disclosure will be described in detail together with the accompanying drawings. Hereinafter, an embodiment of the disclosure will be described using the 5G system as an example, but the embodiment of the disclosure may be applied to other communication systems having similar technical backgrounds or channel types. For example, LTE or LTE-A mobile communication and mobile communication technology developed subsequent to 5G may be included in the embodiments of the disclosure. Therefore, embodiments of the disclosure may be applied to other communication systems through some modifications within a range that does not depart from the scope of the disclosure, as determined by a person skilled in the art.

In addition, if a detailed description of a related function or configuration is determined to unnecessarily obscure the subject matter of the disclosure, the detailed description will be omitted. In addition, terms to be described later are terms defined in consideration of their functions in the disclosure, and may vary according to a user's or operator's intention or practice. Therefore, the definition of the terms should be made based on the contents throughout the specification.

First Embodiment

A base station may configure one or multiple rate-matching resources (RMR) via higher layer signaling (e.g., system information or RRC signaling) in a UE. The rate-matching resource configuration information may include frequency-domain resource allocation information (a first bitmap), time-domain resource allocation information (a second bitmap), and periodic information (a third bitmap).

The base station may select some of the additionally configured rate-matching resources and group the selected resources into a resource set group (RSG), and may indicate to the UE whether the data channel has been rate-matched with respect to time and frequency resources included in each resource set group (i.e., a union domain of rate-matching resources existing in the group) through DCI using a bitmap method.

For example, when there are N resource set groups, the base station may notify the UE whether rate matching has been performed in each resource set group in the form of an N-bit bitmap. Specifically, for example, if four rate-matching resources RMR #1, RMR #2, RMR #3, and RMR #4 are configured, the base station may configure RSG #1={RMR #1, RMR #2} and RSG #2={RMR #3, RMR #4} as resource set groups, and may indicate to the UE whether rate matching for the downlink data channel has been performed in the time and frequency resources included in each of RSG #1 and RSG #2 in a bitmap method.

In a process of performing the rate matching operation, if rate-matching resources configured by different period information (a third bitmap) are grouped into one resource set group, the rate-matching resource domain included in the resource set group may differ over time (for each slot). This will be described in detail with reference to the drawings.

Figure 5:
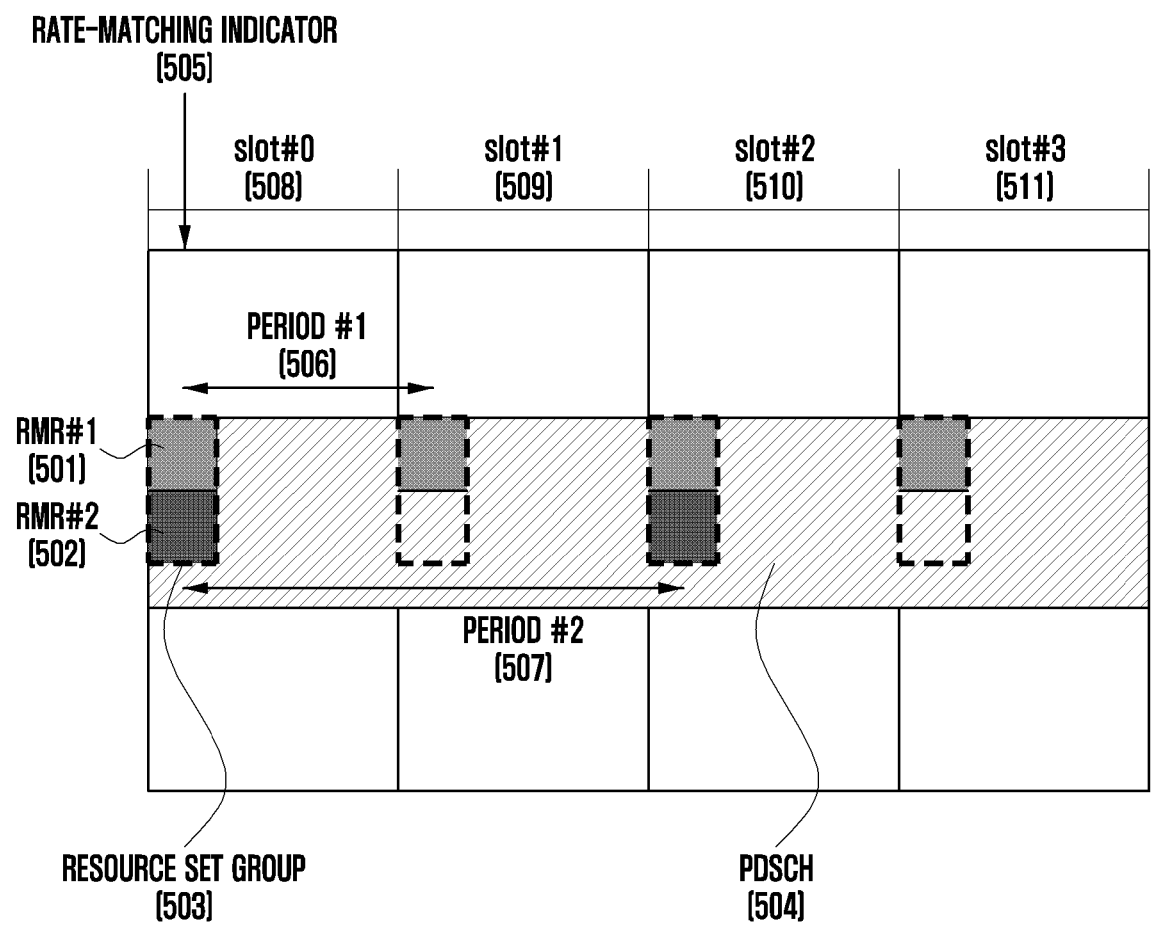
FIG. 5 illustrates an example of a rate-matching operation according to an embodiment of the disclosure.

FIG. 5 illustrates an example of a rate-matching operation considered for implementation in 5G according to an embodiment of the disclosure.

Referring to FIG. 5, two rate-matching resources RMR #1 501 and RMR #2 502 are shown in FIG. 5, and RMR #1 501 and RMR #2 502 are grouped and configured as a resource set group 503. Whether or not rate matching for a PDSCH 504 in the resource set group 503 has been performed may be indicated to the UE through the DCI through a rate-matching indicator 505.

FIG. 5 shows the case in which rate-matching resources in the resource set group 503 are configured with different periods. In FIG. 5, period #1 506 of RMR #1 501 is configured as one slot, and period #2 507 of RMR #2 502 is configured as two slots. In this case, at the time point of receiving the rate-matching indicator 505, whether or not the actual rate-matching resource exists in the resource set group 503 may differ. For example, both RMR #1 501 and RMR #2 502 may exist in slot #0 508, but only RMR #1 501 may exist in slot #1 509. Therefore, when the rate-matching indicator 505 is received, a method of determining whether to perform rate matching for the resource set group 503 is additionally required.

This is especially important when multi-slot scheduling for PDSCH 504 has been performed. FIG. 5 shows the case where multi-slot scheduling in which the aggregation factor corresponds to four slots is performed for the PDSCH 504. Here, the rate-matching indicator 505 for the resource set group 503 may be transmitted only once through the DCI scheduling the PDSCH 504, and the rate matching by the PDSCH 504 depending on the corresponding rate-matching indicator 505 may be identically applied to all slots in which the PDSCH 504 has been scheduled. That is, in the example of FIG. 5, when the PDSCH 504 has been scheduled for slot #0 508, slot #1 509, slot #2 510, and slot #3 511, the rate-matching indicator 505 is indicated in slot #0 508, the same rate-matching operation may be applied to slot #0 508, slot #1 509, slot #2 510, and slot #3 511. Here, whether or not the actual rate-matching resource exists in the resource set group 503 in each slot may differ depending on period information of each rate-matching resource, and accordingly, a resource in each slot needs to be determined in order to perform rate matching for the PDSCH 504.

(1-1)th Embodiment

In a method of determining whether to perform rate matching for the PDSCH, if rate-matching resources configured with different period information (a third bitmap) are grouped into one resource set group and the rate-matching indicator for the resource set group is transmitted, rate matching can be performed only for an actually valid rate-matching resource at a time point (a specific slot) at which the content of the rate-matching indicator is applied in consideration of individual period information of each of rate-matching resources in the resource set group. That is, a time or frequency resource domain included in a resource set group in slot n may be considered as a domain of rate-matching resources actually existing in slot n, and whether the PDSCH is rate-matched in the corresponding domain may be determined according to the rate-matching indicator.

This will be specifically described with reference to the drawings. In the method of determining whether to perform rate matching for the PDSCH 504 in FIG. 5, in the situation in which the PDSCH 504 has been scheduled for slot #0 508, slot #1 509, slot #2 510, and slot #3 511 and the rate-matching indicator 505 transmitted in slot #0 508 indicates to perform rate matching for the resource set group 503, according to the (1-1)th embodiment, the UE may consider individual period information of RMR #1 501 and RMR #2 502, and thus may assume rate matching for a resource domain obtained by combining RMR #1 501 and RMR #2 502 in slot #0 508 and slot #2 510 and assume rate matching for a resource domain of RMR #1 501 in slot #1 509 and slot #3 511

(1-2)th Embodiment

In the method of determining whether to perform rate matching for the PDSCH, if rate-matching resources configured with different period information (a third bitmap) have been grouped into one resource set group and the rate-matching indicator for the resource set group is transmitted, the same period P may be applied to all rate-matching resources existing in the resource set group to determine a rate-matching resource at the time point (specific slot) at which rate matching is applied according to the rate-matching indicator. That is, with respect to all rate-matching resources which are grouped into a resource set group, the UE may ignore period information which has been previously configured and apply a new period P. Accordingly, the UE may determine a time or frequency resource included in the resource set group in slot n. That is, it is assumed that all rate-matching resources, which are grouped into a resource set group, exist at a time point at which the corresponding resource set group exists according to a new period P, and accordingly the UE may determine a rate-matching resource for the PDSCH.

The method of determining a period P applied to the resource set group may be based on the following methods.

[Method 1]

P may be determined by the smallest period value among periods of all rate-matching resources existing in the resource set group. That is, if there are a total of N rate-matching resources RMR #1, RMR #2 . . . , and RMR #N in the resource set group, and the periods thereof are P1, P2 . . . , and PN respectively, P may correspond to the period having the smallest value, among P1, P2, . . . , and PN.

[Method 2]

P may be determined as the period having a value corresponding to the greatest common factor of period values of all rate-matching resources existing in the resource set group. That is, if a total of N rate-matching resources RMR #1, RMR #2 . . . , and RMR #N exist in the resource set group, and the periods thereof are P1, P2 . . . , and PN respectively, P may correspond to the period having the value corresponding to the greatest common factor among periods P1, P2, . . . , and PN.

[Method 3]

P may correspond to one slot.

[Method 4]

The base station may additionally configure the P value in the UE via higher layer signaling (e.g., RRC signaling).

This will be specifically described with reference to the drawings.

Figure 6:
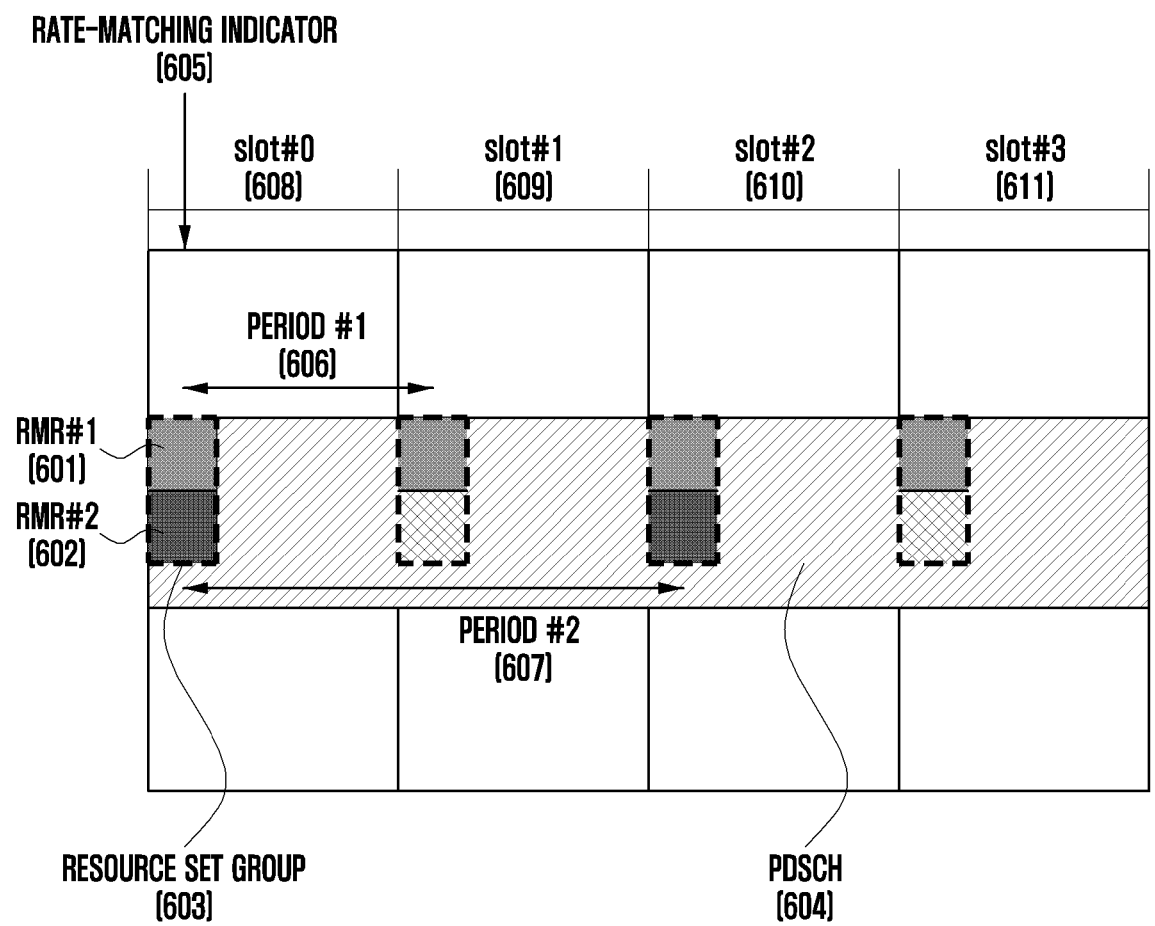
FIG. 6 illustrates another example of a rate-matching operation according to an embodiment of the disclosure.

FIG. 6 illustrates another example of a rate-matching operation according to an embodiment of the disclosure.

Referring to FIG. 6, in the method of determining whether to perform rate matching for a PDSCH 604, If RMR #1 601 is configured as period #1 606 corresponding to one slot, RMR #2 602 is configured as period #2 607 corresponding to two slots, and RMR #1 601 and RMR #2 602 are grouped into a resource set group 603, the UE may apply period P (in the example of FIG. 6, P corresponds to one slot) to both RMR #1 601 and RMR #2 602 to determine a resource domain included in the resource set group. That is, RMR #2 602 does not actually exist in slot #1 609 and slot #3 611, but the UE may assume that RMR #2 602 exists and consider the same as a rate-matching resource.

According to the operation described above, in the situation in which the PDSCH 604 is scheduled for slot #0 608, slot #1 609, slot #2 610, and slot #3 611, and the rate-matching indicator 605 transmitted in slot #0 608 indicates to perform rate matching for the resource set group 603, the period P (=one slot) is applied to RMR #1 601 and RMR #2 602 and thus rate matching may be performed for a resource domain obtained by combining RMR #1 601 and RMR #2 602 in all of slot #0 608, slot #1 609, slot #2 610, and slot #3 611.

Second Embodiment

In 5G, a base station may configure one or multiple bandwidth parts (BWP) in a UE. In frequency-division duplexing (FDD), a downlink bandwidth part and an uplink bandwidth part may be individually configured. In time-division duplexing (TDD), a pair of a downlink bandwidth part and an uplink bandwidth part may be configured. One bandwidth part among the configured downlink/uplink bandwidth parts may be activated. Whether or not the configured bandwidth part has been activated may be semi-statically transmitted from the base station to the UE through RRC signaling, or may be dynamically transmitted through DCI.

The base station may dynamically indicate a change in the bandwidth part by transmitting a bandwidth part index to be activated to the UE through the DCI. A bandwidth part index indicator may be transmitted through downlink scheduling DCI or uplink scheduling DCI. In FDD, the downlink bandwidth part may be dependent on a bandwidth part index, indicated by the downlink scheduling DCI, and the uplink bandwidth part may dependent on a bandwidth part index indicated by the uplink scheduling DCI. In TDD, since a pair of the uplink bandwidth part and the downlink bandwidth part is configured, the bandwidth part index indicated by the uplink or downlink scheduling DCI may indicate a change in the uplink and downlink bandwidth part pair.

In a carrier aggregation environment, the UE may transmit HARQ-ACK for data, which is transmitted through a PDSCH in a secondary cell (Scell), through a physical uplink control channel (PUCCH) of a primary cell (Pcell). Here, the uplink bandwidth part of the Pcell may be changed between the time point t1 at which the scheduling DCI for the PDSCH of the Scell is received and the time point t2 at which the HARQ-ACK for the PDSCH is transmitted. Here, if the PUCCH resource for originally intending to transmit the HARQ-ACK of the Scell cannot be used as it is due to the change in the bandwidth part of the Pcell, an operation of transmitting the HARQ-ACK needs to be defined. In the situation described above, a method of transmitting HARQ-ACK for the PDSCH of the Scell may be performed based on the following operations.

For the sake of easy explanation, the following terms are used.

t1: the time point at which the UE receives the scheduling DCI for the PDSCH of the Scell t2: the time point at which HARQ-ACK transmission for the PDSCH of the Scell is performed

[Method 1]

Figure 7:
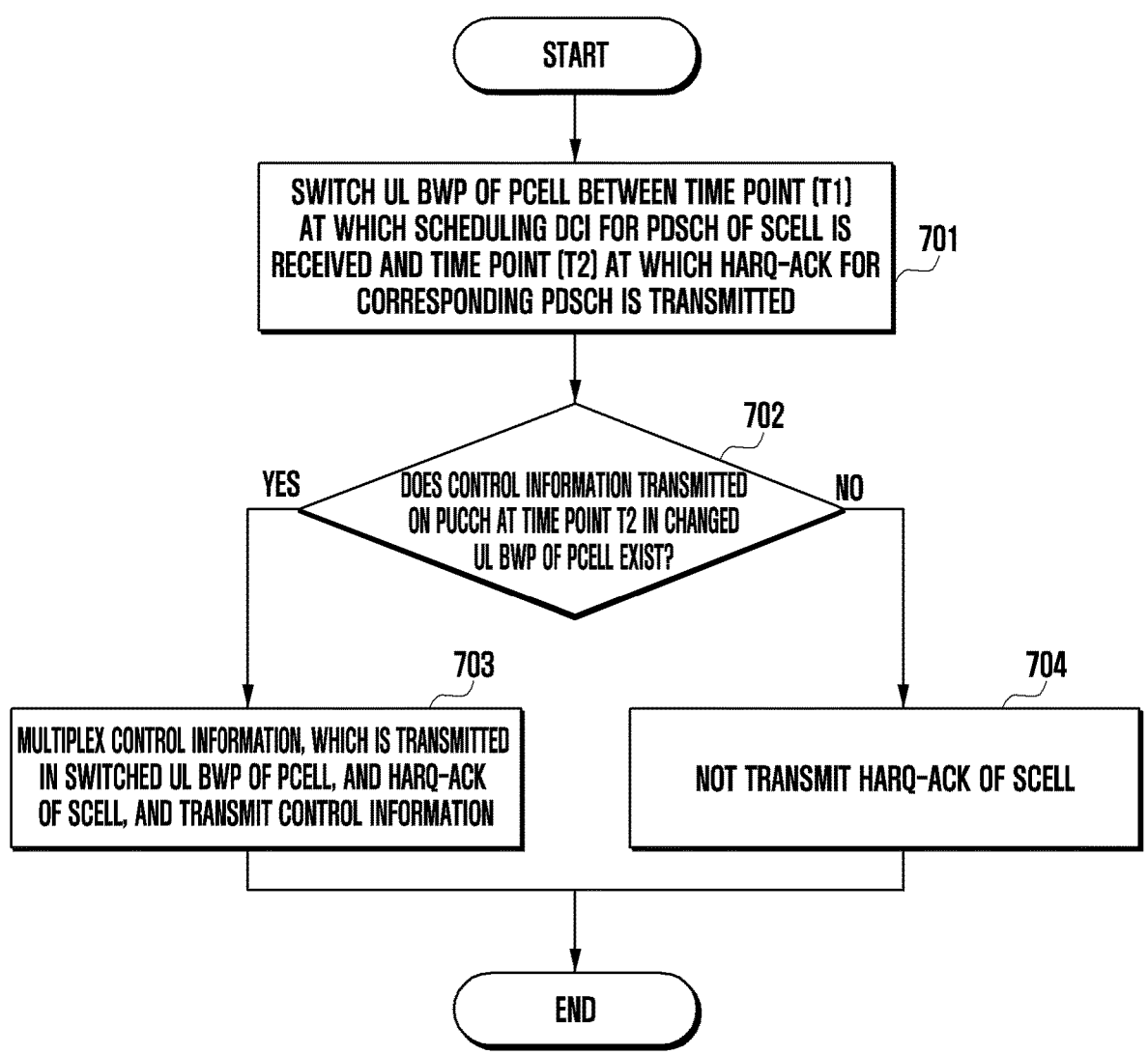
FIG. 7 illustrates a UE operation for HARQ ACK transmission according to an embodiment of the disclosure.

FIG. 7 illustrates a UE operation for HARQ ACK transmission according to an embodiment of the disclosure.

In operation 701, if the UE switched the uplink bandwidth part of the Pcell between the time point t1 and the time point t2, the UE may determine whether control information, which will be transmitted on a PUCCH at a time point t2 in the changed uplink bandwidth part of the Pcell, exists in operation 702.

If there is control information to be transmitted through the PUCCH at the time point t2, the UE multiplexes the control information, which is transmitted to the changed uplink bandwidth part of the Pcell, and an HARQ-ACK for the data transmitted through the Scell and transmits the control information to a base station in operation 703.

If no control information to be transmitted exists, the UE may drop the HARQ-ACK of the Scell without transmitting the same in operation 704.

[Method 1]

Figure 8:
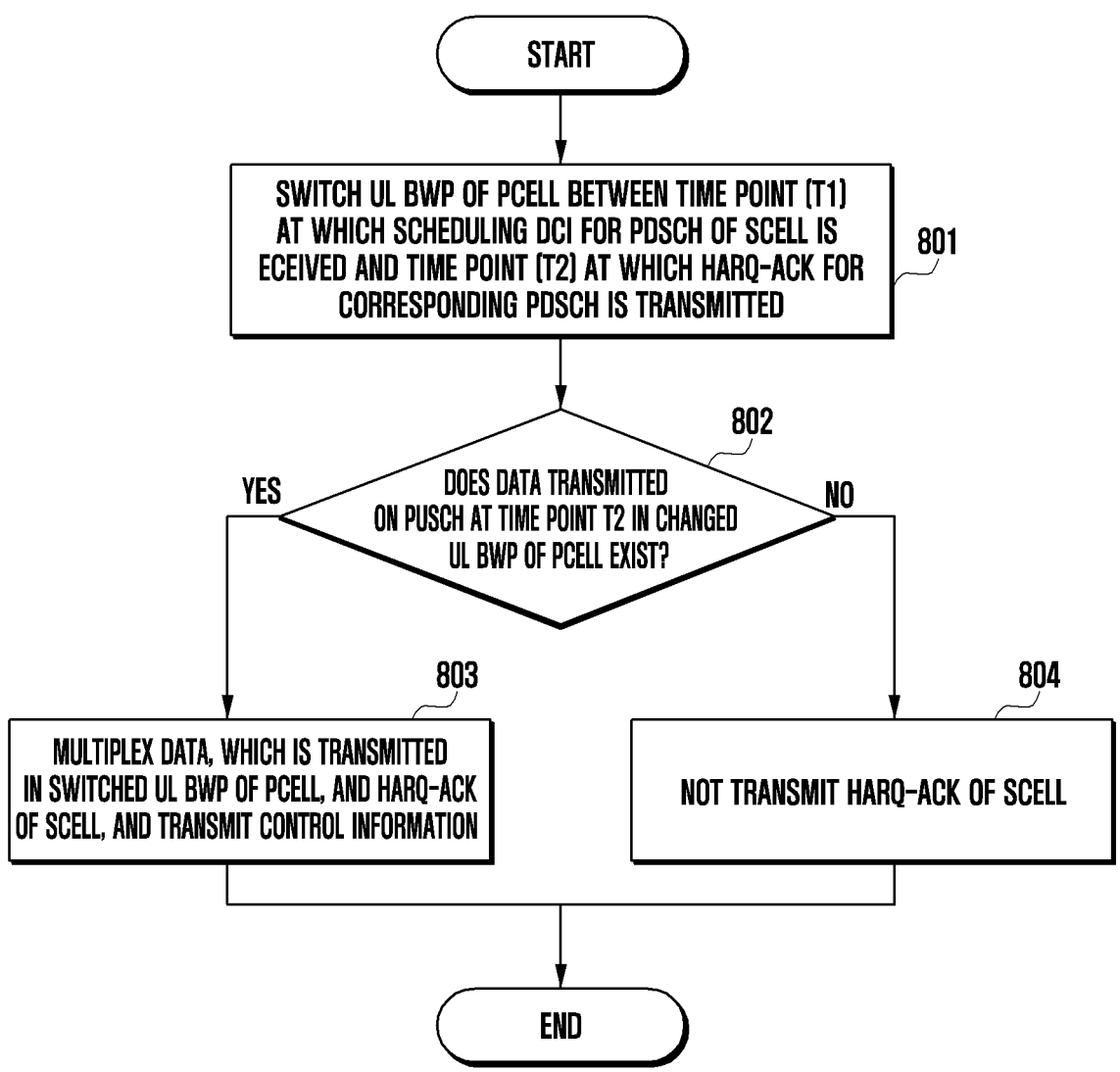
FIG. 8 illustrates another UE operation for HARQ QCK transmission according to an embodiment of the disclosure.

FIG. 8 illustrates a UE operation for HARQ-ACK transmission according to an embodiment of the disclosure.

In operation 801, if the UE has switched the uplink bandwidth part of the Pcell between a time point t1 and a time point t2, the UE may determine whether a scheduled PUSCH exists at a time point t2 in the changed uplink bandwidth part of the Pcell in operation 802.

If the scheduled PUSCH exists, the UE may multiplex data, which will be transmitted on the PUSCH in the changed uplink bandwidth part of the Pcell, and the HARQ-ACK of the Scell and transmit the control information to the base station in operation 803.

If no scheduled PUSCH exists, the UE may drop the HARQ-ACK of the Scell without transmitting the same in operation 804.

Figure 9:
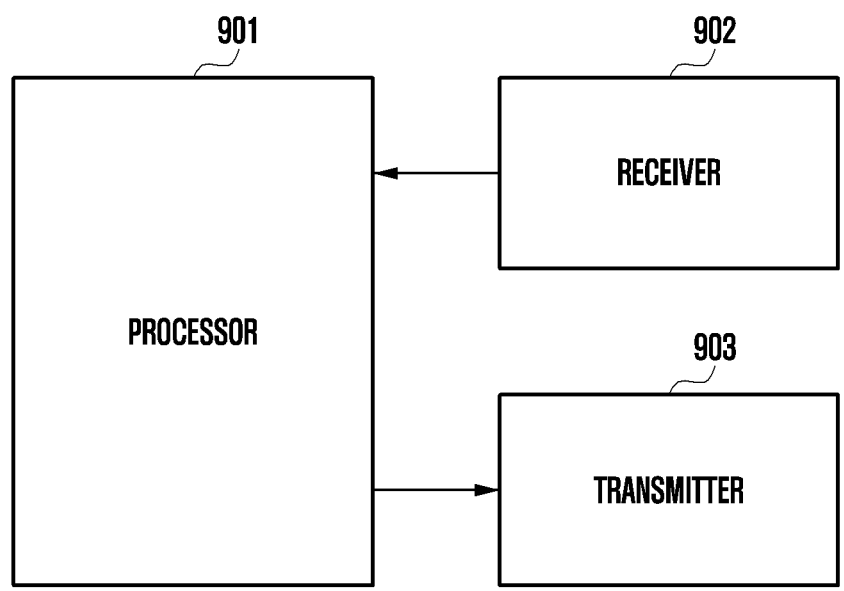
FIG. 9 is a block diagram showing the internal structure of a terminal according to an embodiment of the disclosure.
Figure 10:
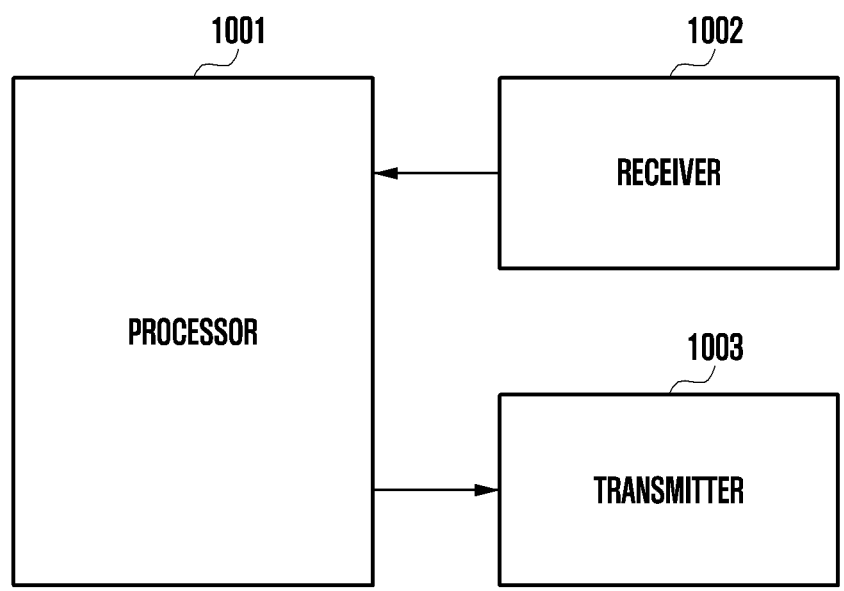
FIG. 10 is a block diagram showing the internal structure of a base station according to an embodiment of the disclosure.

In order to perform the embodiments of the disclosure described above, a transmitter, a receiver, and a controller of a UE and a base station, respectively, are illustrated in FIGS. 9 and 10. Here, a transmission or reception method by a base station and a UE, respectively, is illustrated for applying a method for transmitting or receiving a downlink control channel and a data channel in a 5G communication system corresponding to the embodiments described above, and in order to perform the transmission or reception method, a transmitter, a receiver, and a processor of each of the base station and the UE need to operate according to the embodiment.

Specifically, FIG. 9 is a block diagram showing the internal structure of a UE according to an embodiment of the disclosure.

As shown in FIG. 9, the UE of the disclosure may include a processor 901, a receiver 902, and a transmitter 903.

The processor 901 may control a series of processes by which the UE may operate according to the embodiment of the disclosure described above. For example, the processor may control the rate-matching operation for a data channel and the HARQ-ACK transmission operation differently according to embodiments of the disclosure.

The receiver 902 and the transmitter 903 may be collectively referred to as a transceiver in an embodiment of the disclosure. The transceiver may transmit or receive a signal. The signal may include control information and data. To this end, the transceiver may include an RF transmitter for up-converting and amplifying the frequency of a transmitted signal, an RF receiver for low-noise amplifying a received signal and down-converting the frequency, and the like. In addition, the transceiver may receive a signal through a wireless channel, output the signal to the processor 901, and transmit the signal output from the processor 901 through the wireless channel.

FIG. 10 is a block diagram showing the internal structure of a base station according to an embodiment of the disclosure.

As shown in FIG. 10, the base station of the disclosure may include a processor 1001, a receiver 1002, and a transmitter 1003.

The processor 1001 may control a series of processes by which the base station may operate according to the embodiment of the disclosure described above. For example, the processor may control the rate-matching operation for a data channel and a HARQ-ACK reception method differently according to embodiments of the disclosure.

The receiver 1002 and the transmitter 1003 may be collectively referred to as a transceiver in an embodiment of the disclosure. The transceiver may transmit or receive a signal to or from a UE. The signal may include control information and data. To this end, the transceiver may include an RF transmitter for up-converting and amplifying the frequency of a transmitted signal, an RF receiver for low-noise amplifying a received signal and down-converting the frequency, and the like. In addition, the transceiver may receive a signal through a wireless channel, output the signal to the processor 1001, and transmit the signal output from the processor 1001 through the wireless channel.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical spirit of the disclosure. Further, the above respective embodiments may be employed in combination, as necessary.

The invention claimed is:

1. A method performed by a terminal in a wireless communication system, the method comprising:
    receiving, from a base station, configuration information including information on an aggregation factor indicating a number of repetitions for data, information on a rate matching resource, and information on at least one rate matching group, each rate matching group including a plurality of rate matching resources;
    receiving, from the base station, control information for scheduling of a physical downlink shared channel (PDSCH), the control information including a rate matching indicator indicating whether to rate match the PDSCH in each rate matching group of the at least one rate matching group; and
    decoding the PDSCH which is rate matched based on a rate matching group indicated by the rate matching indicator,
    wherein the rate matching indicator is applied to a set of slots where a union of rate matching resources included in the rate matching group is present among slots of the scheduled PDSCH.

2. The method of claim 1, further comprising:
    identifying consecutive slots in which the PDSCH is to be received, based on the information on the aggregation factor and the control information,
    wherein the slots of the scheduled PDSCH are the consecutive slots, and
    wherein the union of rate matching resources included in the rate matching group is not available for the PDSCH.

3. The method of claim 1, wherein the information on the rate matching resource includes information on a periodicity, information on a time resource, and information on a frequency resource.

4. The method of claim 1, wherein a number of bits of the rate matching indicator is determined based on a number of the at least one rate matching group,
    wherein each bit of the rate matching indicator corresponds to each rate matching group of the at least one rate matching group, and
    wherein the number of repetitions for data is configured to one of 1, 2, 4, and 8.

5. The method of claim 1, wherein the configuration information is received via a radio resource control (RRC) signaling, and wherein the control information is received on a physical downlink control channel (PDCCH).

6. A method performed by a base station in a wireless communication system, the method comprising:
   transmitting, to a terminal, configuration information including information on an aggregation factor indicating a number of repetitions for data, information on a rate matching resource, and information on at least one rate matching group, each rate matching group including a plurality of rate matching resources;
   transmitting, to the terminal, control information for scheduling of a physical downlink shared channel (PDSCH), the control information including a rate matching indicator indicating whether to rate match the PDSCH in each rate matching group of the at least one rate matching group; and
   transmitting, to the terminal, the data on the PDSCH which is rate matched based on a rate matching group indicated by the rate matching indicator,
   wherein the rate matching indicator is applied to a set of slots where a union of rate matching resources included in the rate matching group is present among slots of the scheduled PDSCH.

7. The method of claim 6,
   wherein consecutive slots in which the data on the PDSCH is transmitted are determined based on the information on the aggregation factor and the control information,
   wherein the slots of the scheduled PDSCH are the consecutive slots, and
   wherein the union of rate matching resources included in the rate matching group is not available for the PDSCH.

8. The method of claim 6, wherein the information on the rate matching resource includes information on a periodicity, information on a time resource, and information on a frequency resource.

9. The method of claim 6, wherein a number of bits of the rate matching indicator is determined based on a number of the at least one rate matching group,
   wherein each bit of the rate matching indicator corresponds to each rate matching group of the at least one rate matching group, and
   wherein the number of repetitions for data is configured to one of 1, 2, 4, and 8.

10. The method of claim 6, wherein the configuration information is transmitted via a radio resource control (RRC) signaling, and
   wherein the control information is transmitted on a physical downlink control channel (PDCCH).

11. A terminal in a wireless communication system, the terminal comprising:
   a transceiver; and
   a controller coupled with the transceiver and configured to:
   receive, from a base station, configuration information including information on an aggregation factor indicating a number of repetitions for data, information on a rate matching resource, and information on at least one rate matching group, each rate matching group including a plurality of rate matching resources,
   receive, from the base station, control information for scheduling of a physical downlink shared channel (PDSCH), the control information including a rate matching indicator indicating whether to rate match the PDSCH in each rate matching group of the at least one rate matching group, and
   decode the PDSCH which is rate matched based on a rate matching group indicated by the rate matching indicator,
   wherein the rate matching indicator is applied to a set of slots where a union of rate matching resources included in the rate matching group is present among slots of the scheduled PDSCH.

12. The terminal of claim 11,
   wherein the controller is further configured to identify consecutive slots in which the PDSCH is to be received, based on the information on the aggregation factor and the control information,
   wherein the slots of the scheduled PDSCH are the consecutive slots, and
   wherein the union of rate matching resources included in the rate matching group is not available for the PDSCH.

13. The terminal of claim 11, wherein the information on the rate matching resource includes information on a periodicity, information on a time resource, and information on a frequency resource.

14. The terminal of claim 11, wherein a number of bits of the rate matching indicator is determined based on a number of the at least one rate matching group,
   wherein each bit of the rate matching indicator corresponds to each rate matching group of the at least one rate matching group, and
   wherein the number of repetitions for data is configured to one of 1, 2, 4, and 8.

15. The terminal of claim 11, wherein the configuration information is received via a radio resource control (RRC) signaling, and
   wherein the control information is received on a physical downlink control channel (PDCCH).

16. A base station in a wireless communication system, the base station comprising:
   a transceiver; and
   a controller coupled with the transceiver and configured to:
   transmit, to a terminal, configuration information including information on an aggregation factor indicating a number of repetitions for data, information on a rate matching resource, and information on at least one rate matching group, each rate matching group including a plurality of rate matching resources;
   transmit, to the terminal, control information for scheduling of a physical downlink shared channel (PDSCH), the control information including a rate matching indicator indicating whether to rate match the PDSCH in each rate matching group of the at least one rate matching group; and
   transmit, to the terminal, the data on the PDSCH which is rate matched based on a rate matching group indicated by the rate matching indicator,
   wherein the rate matching indicator is applied to a set of slots where a union of rate matching resources included in the matching group is present among slots of the scheduled PDSCH.

17. The base station of claim 16,
   wherein consecutive slots in which the data on the PDSCH is transmitted are determined based on the information on the aggregation factor and the control information,
   wherein the slots of the scheduled PDSCH are the consecutive slots, and
   wherein a union of all resources indicated in the rate matching group is not available for the PDSCH.

18. The base station of claim 16, wherein the information on the rate matching resource includes information on a periodicity, information on a time resource, and information on a frequency resource.

19. The base station of claim 16, wherein a number of bits of the rate matching indicator is determined based on a number of the at least one rate matching group,
   wherein each bit of the rate matching indicator corresponds to each rate matching group of the at least one rate matching group, and
   wherein the number of repetitions for data is configured to one of 1, 2, 4, and 8.

20. The base station of claim 16, wherein the configuration information is transmitted via a radio resource control (RRC) signaling, and
   wherein the control information is transmitted on a physical downlink control channel (PDCCH).

* * * * *